(12) United States Patent
Miyashita

(10) Patent No.: US 7,373,185 B2
(45) Date of Patent: May 13, 2008

(54) FOLDABLE MOBILE COMMUNICATION TERMINAL AND CALLING METHOD THEREOF

(75) Inventor: Mafumi Miyashita, Shizuoka (JP)

(73) Assignee: NEC Corporation, Tokyo (JP)

( * ) Notice: Subject to any disclaimer, the term of this patent is extended or adjusted under 35 U.S.C. 154(b) by 415 days.

(21) Appl. No.: 10/172,510

(22) Filed: Jun. 17, 2002

(65) Prior Publication Data

US 2002/0193143 A1 Dec. 19, 2002

(30) Foreign Application Priority Data

Jun. 18, 2001 (JP) .............................. 2001-183405

(51) Int. Cl.
*H04M 1/00* (2006.01)
(52) U.S. Cl. .............................. 455/575.3; 455/575.1; 455/461; 455/445; 455/550.1; 455/575.4; 379/113; 379/229
(58) Field of Classification Search ............. 455/575.3, 455/575.8, 90.3, 565, 569.1, 556.1, 556, 455/575, 90, 550, 128, 433.13, 575.4
See application file for complete search history.

(56) References Cited

U.S. PATENT DOCUMENTS

| | | | | |
|---|---|---|---|---|
| 5,584,054 A | * | 12/1996 | Tyneski et al. | ............. 455/566 |
| 5,797,089 A | | 8/1998 | Nguyen | |
| 6,347,232 B1 | * | 2/2002 | de Casillas | ............. 455/550.1 |
| 6,526,296 B1 | * | 2/2003 | Nieminen | ............. 455/575.3 |
| 6,567,672 B1 | * | 5/2003 | Park et al. | ............. 455/574 |
| 6,587,700 B1 | * | 7/2003 | Meins et al. | ............. 455/575.8 |
| 2002/0022503 A1 | * | 2/2002 | Lee | ............. 455/566 |

FOREIGN PATENT DOCUMENTS

| | | |
|---|---|---|
| EP | 0 792 077 A1 | 8/1997 |
| EP | 0 962 852 A2 | 12/1999 |
| JP | 8-237158 | 9/1996 |
| JP | 2001-115102 | 4/2001 |
| WO | WO 97/09813 | 3/1997 |

OTHER PUBLICATIONS

United Kingdom Search Report Dated Dec. 24, 2002.
English Translation of the Chinese Office Action dated Oct. 10, 2003.
Japanese Office Action dated Sep. 8, 2004, with English-language translation of relevant portion thereof.

* cited by examiner

*Primary Examiner*—Joseph Feild
*Assistant Examiner*—Randy Peaches
(74) *Attorney, Agent, or Firm*—McGinn IP Law Group, PLLC

(57) ABSTRACT

A foldable mobile communication terminal and a calling method thereof, in which calling operation to a telephone number is started from the open state of its cabinet, and the calling operation is executed smoothly by reducing one of processes of the calling operation. Data communication is executed at the open state of its cabinet and voice communication is executed at the closed state of the cabinet, provides an inner side displaying section for displaying data inputted or received at the open state of the cabinet, a calling number input buffer for storing data of a telephone number displayed on the inner side displaying section, and a voice communication changing-over section for changing-over from the data communication to the voice communication to the telephone number storing in the calling number input buffer, when a state, which the cabinet was closed from the open state of the cabinet, is detected.

6 Claims, 8 Drawing Sheets

FIG. 1
(a)
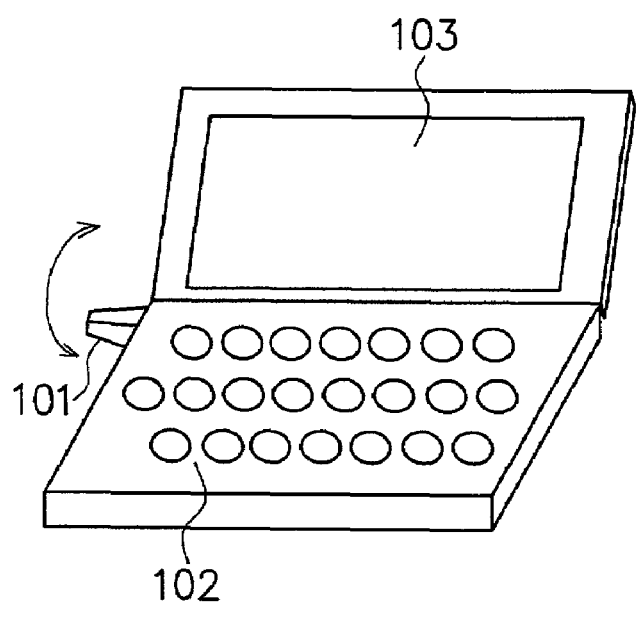
(b)
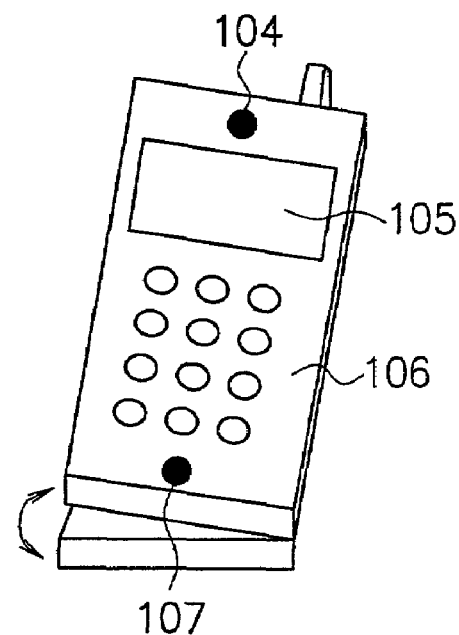

FIG. 3
(a)
INPUT SCREEN
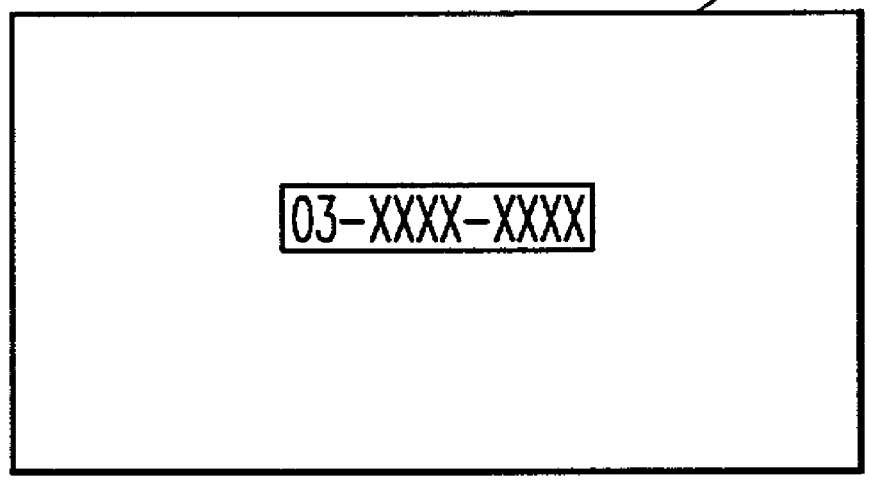
(b)
RECEIVED SCREEN
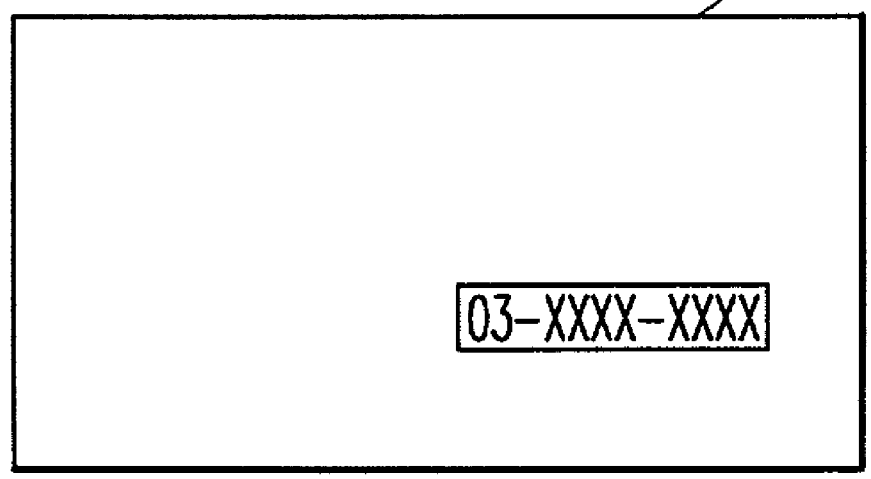

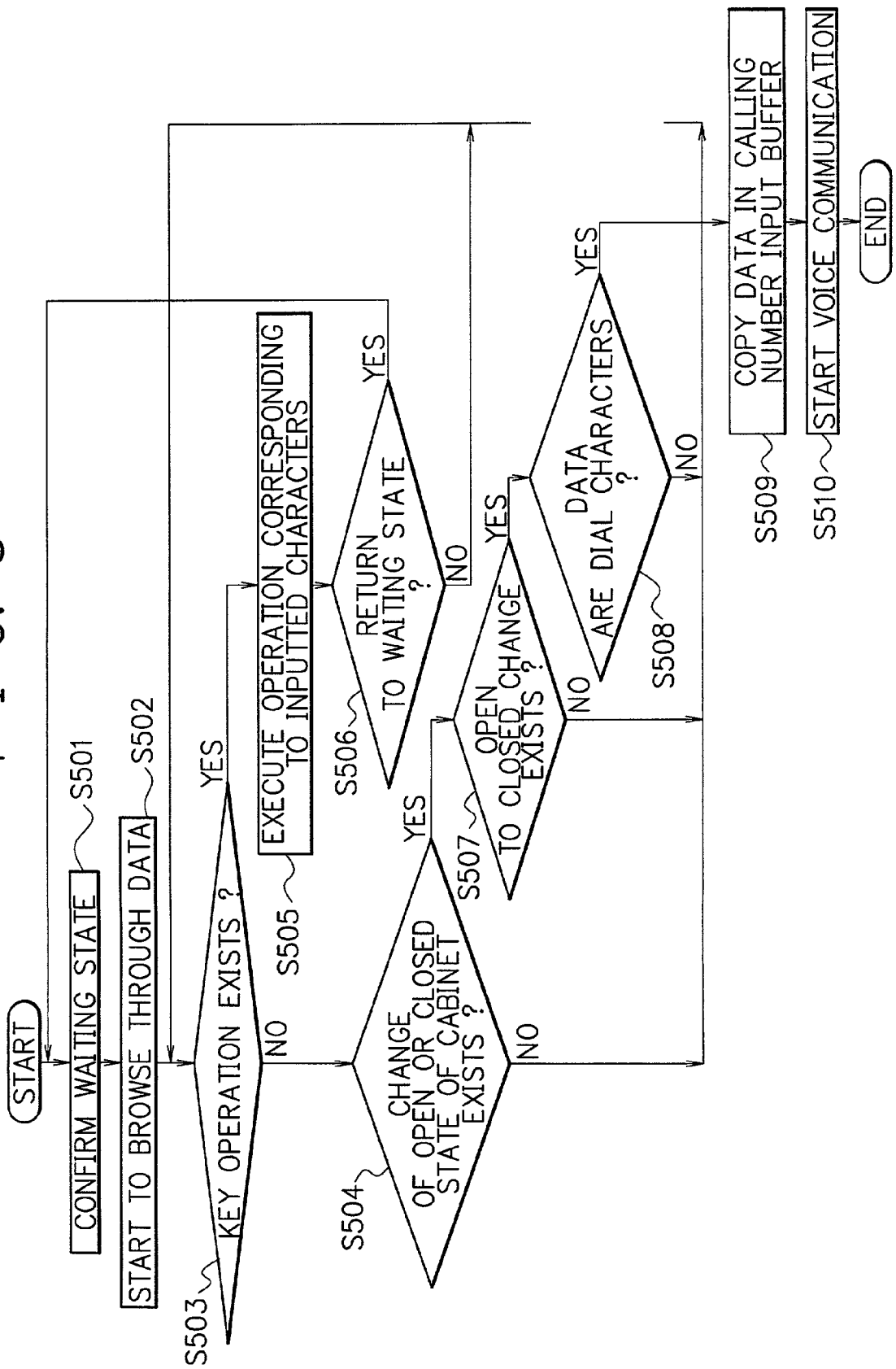

FOLDABLE MOBILE COMMUNICATION TERMINAL AND CALLING METHOD THEREOF

BACKGROUND OF THE INVENTION

The present invention relates to a foldable mobile communication terminal and a calling method thereof, in which data communication is executed at the open state of its cabinet and voice communication is executed at the closed state of the cabinet, in particular, in which calling at the voice communication can be started at the open state of the cabinet and the data communication can be changed over to the voice communication smoothly.

DESCRIPTION OF THE RELATED ART

At a first conventional foldable mobile communication terminal, generally, when it is used for communication, the cabinet is opened, and when it is not used for the communication, the cabinet is closed, except it is used for non-communication operation such as used as a watch.

As a second conventional foldable mobile communication terminal, Japanese Patent Application Laid-Open No. HEI 8-237158 has disclosed an electronic system notebook type mobile communication terminal. In this patent application, an electronic system notebook and a foldable mobile communication terminal are unified and its cabinet can be fully opened. And when the cabinet was opened, both functions of the electronic system notebook and the foldable mobile communication terminal are used, and when the cabinet was closed, only the foldable mobile communication terminal is used. And when a user wants to call a telephone number, calling to the telephone number is executed automatically by referring to the telephone number in the electronic system notebook. However, in this patent application, anything about data communication has not been described. In this, the electronic system notebook has various functions such as a telephone directory, scheduling, making memoranda, a calendar, and a dictionary.

As a third conventional foldable mobile communication terminal, voice communication is executed at the closed state of the cabinet, and data communication is executed at the open state of the cabinet.

However, at the third conventional foldable mobile communication terminal, even the open state of the cabinet is a using state, therefore, opposite to the first conventional foldable mobile communication terminal, when a user wants to start calling to a telephone number at the open state of the cabinet, the user must close the cabinet and set the telephone number.

Further, at the third conventional foldable mobile communication terminal, compared with the second conventional foldable mobile communication terminal, the second conventional foldable mobile communication terminal can communicate at the open state of the cabinet, but as mentioned above, at the third conventional foldable mobile communication terminal, when the calling is executed, the telephone number is set after the open state was changed to the closed state.

Consequently, at the third conventional foldable mobile communication terminal, when a user wants to start calling at the open state of the cabinet, there is a problem that the user needs an additional process to close the cabinet.

SUMMARY OF THE INVENTION

It is therefore an object of the present invention to provide a foldable mobile communication terminal and a calling method thereof, in particular, in which a user can start calling operation from the open state of its cabinet and can reduce a process at the calling operation and can change over from data communication to voice communication smoothly.

According to a first aspect of the present invention, for achieving the object mentioned above, there is provided a foldable mobile communication terminal, in which data communication is executed at the open state of its cabinet and voice communication is executed at the closed state of the cabinet. The foldable mobile communication terminal provides an inner side displaying section for displaying data inputted or received at the open state of the cabinet, a calling number input buffer for storing data of a telephone number displayed on the inner side displaying section, and a voice communication changing over section for changing over from the data communication to the voice communication to the telephone number storing in the calling number input buffer, when a state, which the cabinet was closed from the open state, was detected.

According to a second aspect of the present invention, in the first aspect, the voice communication changing over section suspends the data communication when the data communication was changed over to the voice communication during the data communication, and resumes the suspended data communication when the voice communication was cut off.

According to a third aspect of the present invention, in the first aspect, the voice communication changing over section does not change over from the data communication to the voice communication, when the open state of the cabinet was detected within a designated period after the cabinet had been closed from the open state.

According to a fourth aspect of the present invention, in the third aspect, the designated period is variable.

According to a fifth aspect of the present invention, in the first aspect, in case that the voice communication changing over section detected the open state of the cabinet within a designated period after the cabinet had been closed from the open state during the data communication and the cutting off state of the voice communication, the voice communication changing over section keeps the cutting off state of the voice communication and keeps the data communication. And in case that the voice communication changing over section detected the closed state of the cabinet within a designated period after the cabinet had been opened from the closed state during the voice communication and the suspending state of the data communication, the voice communication changing over section keeps the suspending state of the data communication and keeps the voice communication.

According to a sixth aspect of the present invention, in the fifth aspect, the designated period after the cabinet was closed from the open state is variable, and the designated period after the cabinet was opened from the closed state is variable.

According to a seventh aspect of the present invention, in the fifth aspect, the designated period after the cabinet was closed from the open state is different from the designated period after the cabinet was opened from the closed state.

According to an eighth aspect of the present invention, in the first aspect, the calling number input buffer stores the data of a telephone number, which is focused by a display cursor during inputting data or receiving data.

According to a ninth aspect of the present invention, in the first aspect, the calling number input buffer stores data displayed during inputting data or receiving data as a telephone number, when the data was equal to the speed dial of the telephone number.

According to a tenth aspect of the present invention, in the first aspect, the voice communication changing over section permits or prohibits changing over from the data communication to the voice communication by operation from the outside.

According to an eleventh aspect of the present invention, there is provided a calling method of a foldable mobile communication terminal, in which data communication is executed at the open state of its cabinet and voice communication is executed at the closed state of the cabinet. The calling method provides the steps of; displaying inputted data or received data on an inner side displaying section at the open state of the cabinet, storing data of a telephone number displayed on the inner side displaying section, detecting the closed state of the cabinet changing from the open state; and changing over from the data communication to the voice communication to the telephone number, when the closed state of the cabinet changed from the open state was detected.

BRIEF DESCRIPTION OF THE DRAWINGS

The objects and features of the present invention will become more apparent from the consideration of the following detailed description taken in conjunction with the accompanying drawings in which:

FIG. 1 is a perspective view showing an embodiment of a foldable mobile communication terminal of the present invention;

FIG. 3 is a diagram showing cases in which data of a telephone number is displayed on an inner side displaying section at each of an input screen and a received screen at the embodiment of the present invention;

FIG. 8 is a flowchart showing operation of the voice communication changing over section in the controller at the time when data are receiving at the embodiment of the calling method of the present invention.

DESCRIPTION OF THE PREFERRED EMBODIMENTS

Figure 2:
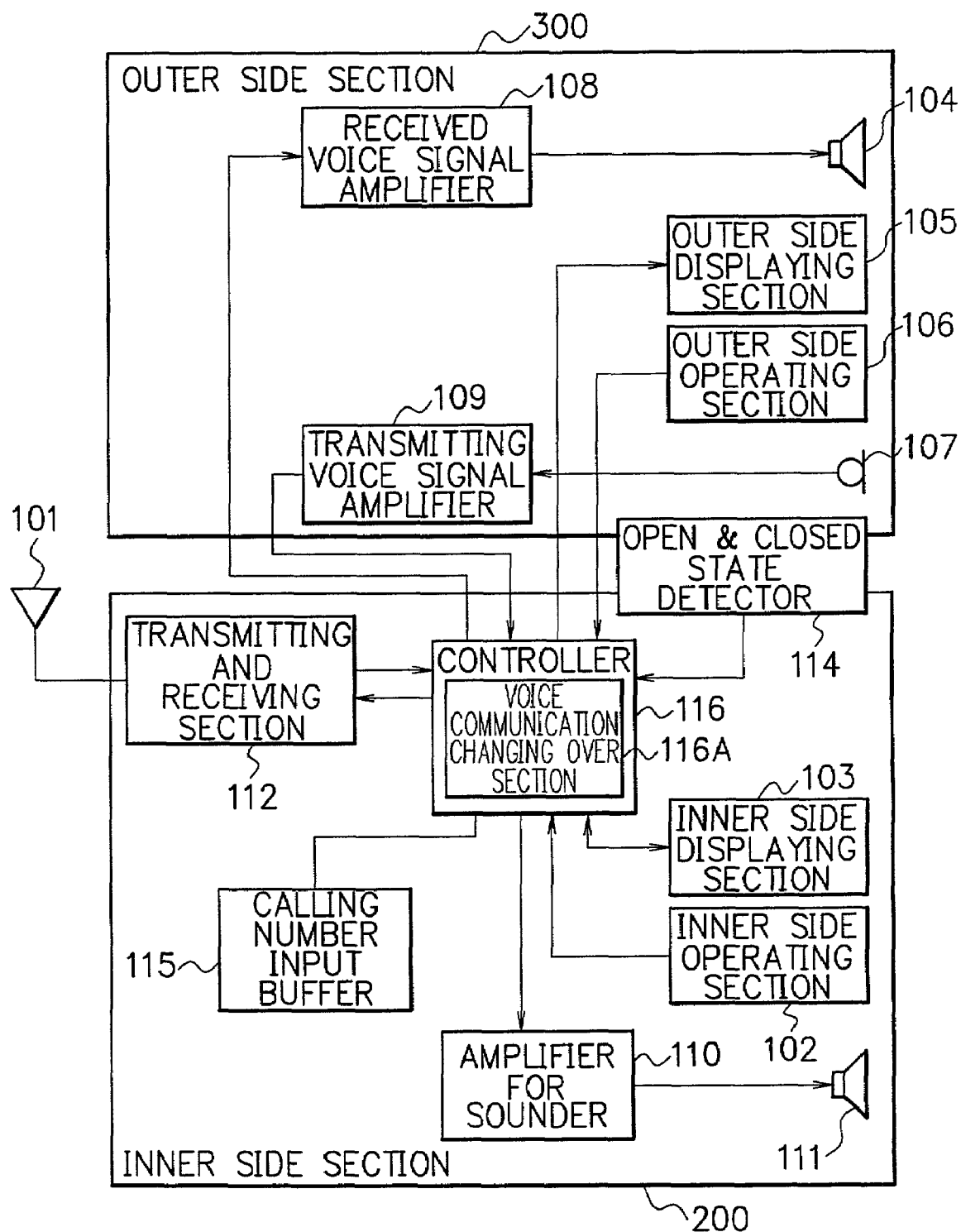
FIG. 2 is a block diagram showing a structure of the embodiment of the foldable mobile communication terminal of the present invention.

Referring now to the drawings, embodiments of the present invention are explained in detail. FIG. 1 is a perspective view showing an embodiment of a foldable mobile communication terminal of the present invention. In FIG. 1(a), the open state of the cabinet of the foldable mobile communication terminal of the present invention is shown, and In FIG. 1(b), the closed state of the cabinet of the foldable mobile communication terminal of the present invention is shown. As shown in FIG. 1, at the foldable mobile communication terminal of the present invention, voice communication is executed at the closed state of the cabinet, being a folded small size state of the cabinet, and data communication is executed at the open state of the cabinet. This is different from the first and second conventional foldable mobile communication terminals, but is the same as the third conventional foldable mobile communication terminal. However, at the present invention, changing over from the data communication to the voice communication can be executed smoothly. Further, the foldable mobile communication terminal of the present invention can be carried at the closed state of the cabinet, when it is not used.

As shown in FIG. 1(a), the foldable mobile communication terminal of the present invention provides an inner side displaying section 103 having a large screen size, by fully using one inner side of the cabinet, and an inner side operating section 102 being a keyboard having many keys with which a user can easily input information, by using the other inner side of the cabinet, at the open state of the cabinet. Further, the foldable mobile communication terminal of the present invention provides an antenna 101 for transmitting and receiving signals. At this open state of the cabinet, data communication such as, transmitting and receiving e-mails being used frequently, and browsing through web sites, is executed. And at this open state of the cabinet, viewing and searching information storing in the foldable mobile communication terminal is also executed.

Since the data communication is executed at the open state of the cabinet, the voice communication is executed at the closed state of the cabinet. In order to execute the voice communication, as shown in FIG. 1(b), the foldable mobile communication terminal of the present invention provides a microphone 107 and a speaker 104 on the outer side of the cabinet. Further, the voice communication is executed at the folded state of the foldable mobile communication terminal being the closed state of the cabinet, therefore the foldable mobile communication terminal of the present invention provides an outer side operating section 106 and an outer side displaying section 105 in which operation of the voice communication is displayed.

When the foldable mobile communication terminal received voice communication at the open state of the cabinet, in order that a user starts the voice communication, the user executes receiving operation and folds the cabinet, and starts the voice communication.

FIG. 2 is a block diagram showing a structure of the embodiment of the foldable mobile communication terminal of the present invention. As shown in FIG. 2, the foldable mobile communication terminal of the present invention provides an inner side section 200 and an outer side section 300 corresponding to each of the open and closed states of the cabinet.

As shown in FIG. 2, the inner side section 200 provides the inner side operating section 102, the inner side displaying section 103, an amplifier for sounder 110, a sounder 111, a transmitting and receiving section 112, a calling number input buffer 115, and a controller 116. And the transmitting and receiving section 112 is connected to the antenna 101.

The transmitting and receiving section 112 receives signals from the antenna 101 and demodulates the received signals, and also outputs modulated transmitting signals to the antenna 101. That is, the transmitting and receiving section 112 transmits and receives data and voice signals.

The transmitting and receiving section 112 is connected to the controller 116, and the controller 116 controls all functions of the foldable mobile communication terminal.

The amplifier for sounder 110 is connected to the controller 116, and amplifies received signals inputted from the controller 116 at the time when data communication was received. The sounder 111 is connected to the output side of the amplifier for sounder 110, and the sounder 111 outputs a ringing tone by inputting received signals amplified at the amplifier for sounder 110 and also outputs a sound when the data communication includes some sound.

The inner side operating section 102 and the inner side displaying section 103 are connected to the controller 116, and are controlled by the controller 116 at the time when the cabinet is open. The inner side displaying section 103 displays data received and demodulated trough the antenna 101, the transmitting and receiving section 112, and the controller 116. And also the inner side displaying section 103 displays data inputted by the operation of the inner side operating section 102. The inputted data are modulated and transmitted through the controller 116, the transmitting and receiving section 112, and the antenna 101.

The inner side displaying section 103 also displays the operating contents of the inner side operating section 102. The calling number input buffer 115 is connected to the controller 116, and stores data of a telephone number.

The outer side section 300 provides the speaker 104, the outer side displaying section 105, the outer side operating section 106, the microphone 107, a received voice signal amplifier 108, and a transmitting voice signal amplifier 109.

The received voice signal amplifier 108 is connected to the output side of the controller 116, and operation of the received voice signal amplifier 108 is controlled by the controller 116. And the received voice signal amplifier 108 amplifies received signals decoded at the controller 116.

The speaker 104 is connected to the output side of the received voice signal amplifier 108, and the speaker 104 outputs the voice signals amplified at the received voice signal amplifier 108 as voices. That is, the signals received at the antenna 101 are demodulated at the transmitting and receiving section 112 and are decoded at the controller 116, and are amplified at the received voice signal amplifier 108, and are outputted at the speaker 104 as voices.

The microphone 107 converts transmitting voices into electric signals. The transmitting voice signal amplifier 109 is connected to the output side of the microphone 107, and the controller 116 is connected to the output side of the transmitting voice signal amplifier 109. The transmitting voice signal amplifier 109 amplifies voice signals from the microphone 107 by the control of the controller 116, and outputs the amplified signals to the controller 116.

That is, the voice signals from the microphone 107 are amplified at the transmitting voice signal amplifier 109, and are coded at the controller 116, and are modulated at the transmitting and receiving section 112, and are outputted to the antenna 101 as transmitting signals. The outer side displaying section 105 and the outer side operating section 106 are connected to the controller 116, and the outer side displaying section 105 displays the operating contents of the outer side operating section 106 through the controller 116. The outer side operating section 106 instructs the controller 116 to receive or transmit signals.

The foldable mobile communication terminal of the present invention further provides an open and closed state detector 114, and the open and closed state detector 114 detects the open or closed state of the cabinet of the foldable mobile communication terminal, and outputs the detected signal to the controller 116. The controller 116 monitors the signal detected at the open and closed state detector 114, and changes the operating states of the received voice signal amplifier 108, the transmitting voice signal amplifier 109, the outer side displaying section 104, and the outer side operating section 106, corresponding to the changes of the open and closed states of the cabinet. Further, the controller 116 changes the operating states of the inner side operating section 102 and the inner side displaying section 103, corresponding to the changes of the open and closed states of the cabinet.

That is, in case that the cabinet is at the open state, the inner side operating section 102 and the inner side displaying section 103 are made to be operative, and the received voice signal amplifier 108, the transmitting voice signal amplifier 109, the outer side displaying section 105, and the outer side operating section 106 are made to be non-operative. And in case that the cabinet is at the closed state, the inner side operating section 102 and the inner side displaying section 103 are made to be non-operative, and the received voice signal amplifier 108, the transmitting voice signal amplifier 109, the outer side displaying section 105, and the outer side operating section 106 are made to be operative.

The foldable mobile communication terminal of the present invention further provides a voice communication changing over section 116A in the controller 116. The voice communication changing over section 116A monitors the signal detected at the open and closed state detector 114. And when the foldable mobile communication terminal starts to call at the open state of the cabinet, the voice communication changing over section 116A changes over to the calling smoothly at the open state of the cabinet.

FIG. 3 is a diagram showing cases in which data of a telephone number is displayed on the inner side displaying section 103 at each of an input screen and a received screen at the embodiment of the present invention. As shown in FIG. 3(a), in case that a user is inputting data on the inner side displaying section 103 by using the inner side operating section 102 at the open state of the cabinet of the foldable mobile communication terminal, when the user inputs data of a telephone number and the display cursor is focused on the data, the voice communication changing over section 116A writes the data of the telephone number in the calling number input buffer 115 automatically. With this operation, the telephone number is set before closing the cabinet.

When the cabinet was closed, the voice communication changing over section 116A calls the telephone number storing in the calling number input buffer 115, inputted automatically. In this, in case that the telephone number was inputted as a speed dial composed of numbers, and the inputted numbers were equal to the numbers registered beforehand as the speed dial, the inputted numbers can be written in the calling number input buffer 115. With this operation, the telephone number is set before closing the cabinet.

As mentioned above, the data of the telephone number are not set after the cabinet was closed, but the data of the telephone number can be set during inputting data. Consequently, it becomes possible to change overt to calling by operation of a minimum requirement. That is, the calling is executed at the time when the cabinet became a shape (closed state) by which the calling were able to be executed, therefore, the necessary operation can be minimum, and an unnecessary no voice communication period until connecting to the destination can be avoided.

And as shown in FIG. 3(b), in case that a user is executing data communication at the open state of the cabinet of the foldable mobile communication terminal, when data of a telephone number are included in the received data and a display cursor is focused on the data, the voice communication changing over section 116A writes the data of the telephone number in the calling number input buffer 115 automatically. With this operation, the telephone number is set before closing the cabinet. Further, when the cabinet was closed, the voice communication changing over section 116A calls the telephone number in the data automatically, by suspending the data communication.

At this state, when the cabinet is opened again, the voice communication changing over section 116A cuts off the voice communication automatically, and the data communication is resumed. In this, in case that the numbers in the received data were equal to the numbers registered beforehand as a speed dial, the numbers in the received data can be written in the calling number input buffer 115. With this operation, the telephone number is set before closing the cabinet.

As mentioned above, the data of the telephone number are not set after the cabinet was closed, but the data of the telephone number can be set during receiving data. Consequently, it becomes possible to change over to calling by operation of a minimum requirement. That is, the calling is executed at the time when the cabinet became a shape (closed state) with which the calling were able to be executed, therefore, the necessary operation can be minimum, and an unnecessary no voice communication period until connecting to the destination can be avoided.

In this, the permission/prohibition of the function of the voice communication changing over section 116A can be set by operating the foldable mobile communication terminal of the present invention. That is, the decision, whether the data communication should be changed over to the voice communication or not, can be set by the operation of the foldable mobile communication terminal.

Figure 4:
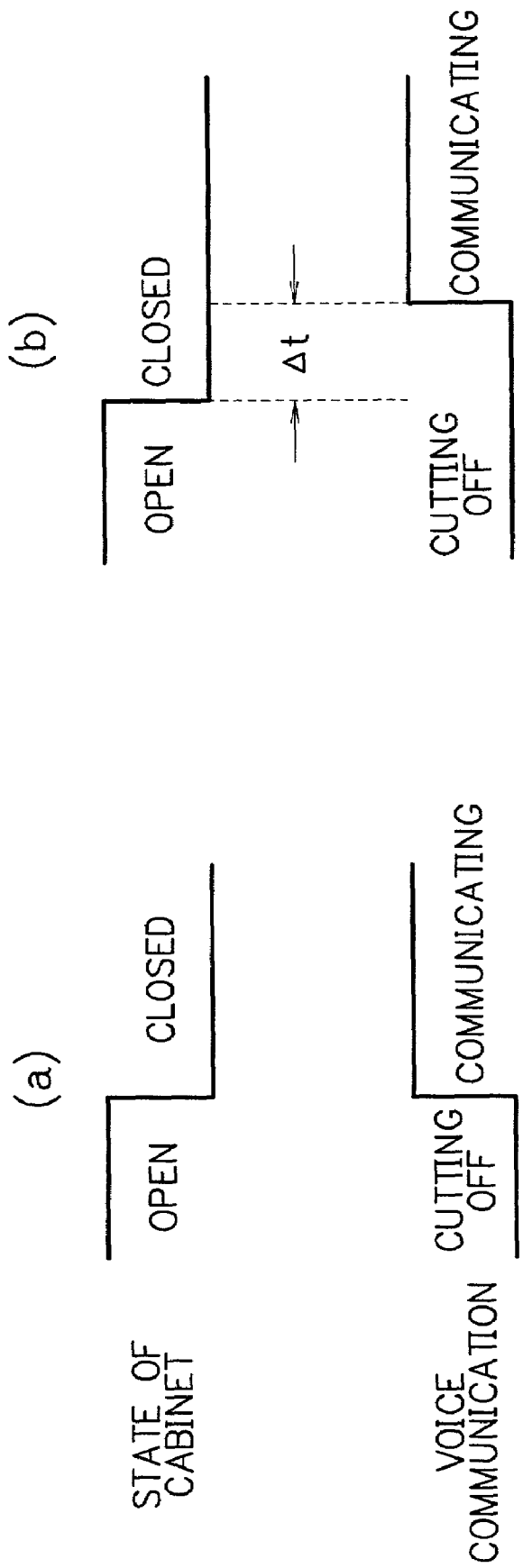
FIG. 4 is a timing chart showing the changing over to calling by a voice communication changing over section in a controller while data are inputting at the embodiment of the present invention.

FIG. 4 is a timing chart showing the changing over to calling by the voice communication changing over section 116A in the controller 116 while data are inputting at the embodiment of the present invention. As shown in FIG. 4(a), at the voice communication changing over section 116A, based on the closed signal of the cabinet detected at the open and closed state detector 114, the voice communication is changed over from a cutting off state to a communication state. However, as shown in FIG. 4(b), actually, the voice communication is not changed over immediately from the cutting off state to the communication state, based on the closed signal of the cabinet detected at the open and closed state detector 114. That is, the voice communication is changed over from the cutting off state to the communication state, after keeping the data communication for a designated period ($\Delta t$).

In case that a user desired to change over from inputting data to voice communication but the user changed his/her mind and desired to continue the inputting data, when the user opened the cabinet soon after closing the cabinet, the voice communication has not started yet during the designated period ($\Delta t$). Therefore, the user can continue the data communication. In this, the designated period ($\Delta t$) is variable and can be set by the user arbitrary.

Figure 5:
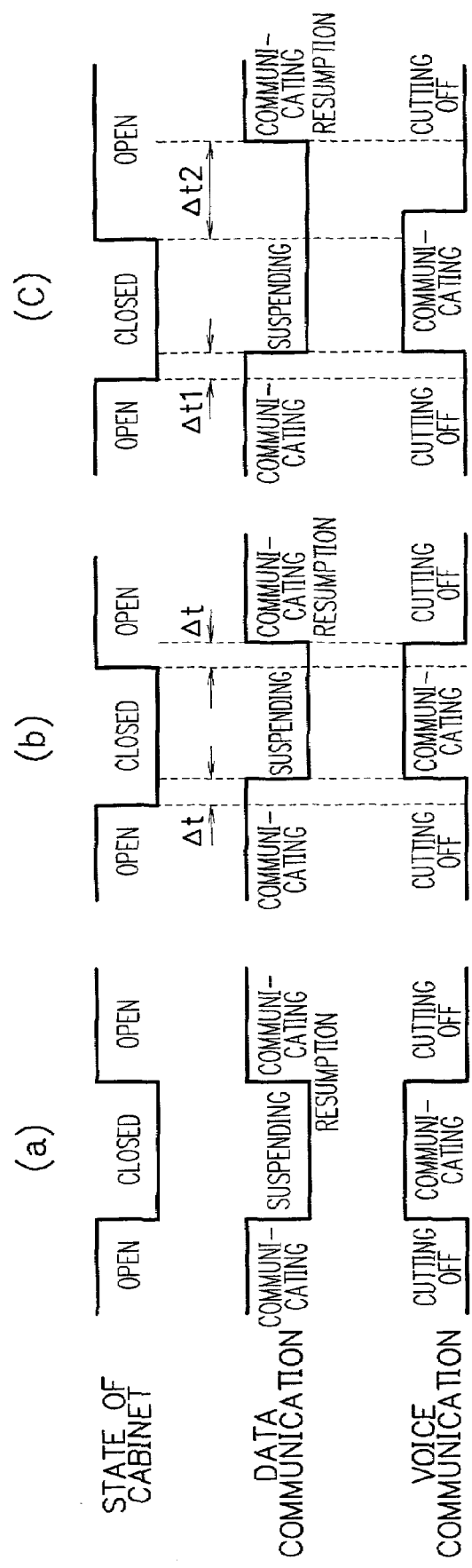
FIG. 5 is a timing chart showing the changing over to calling by the voice communication changing over section in the controller while the data communication is executing at the embodiment of the present invention.

FIG. 5 is a timing chart showing the changing over to calling by the voice communication changing over section 116A in the controller 116 while the data communication is executing at the embodiment of the present invention. As shown in FIG. 5(a), at the voice communication changing over section 116A, based on an open/closed signal of the cabinet detected at the open and closed state detector 114, the data communication and the voice communication are changed over. That is, when the cabinet was changed from the open state to the closed state, the data communication was suspended from the communication state, and the voice communication was changed over from a cutting off state to a communication state. And when the cabinet was changed again from the closed state to the open state, the voice communication is cut off and the data communication is resumed.

However, as shown in FIG. 5(b), actually, the data communication is not changed over immediately from the communication state to the suspending state, and also the voice communication is not changed over immediately from the cutting off state to the communication state, based on the open/closed signal of the cabinet detected at the open and closed state detector 114. That is, the voice and data communication is changed over to the other state after keeping currently using state for a designated period ($\Delta t$). And when the closed state of the cabinet is changed again to the open state of the cabinet, the voice communication is not changed over to cut off immediately. That is, after keeping the voice communication for the designated period ($\Delta t$), the data communication is resumed.

In case that a user desired to change over from the data communication to the voice communication but the user changed his/her mind and desired to continue the data communication, when the user opened the cabinet soon after closing the cabinet, the data communication has not been suspended yet. Therefore, the user can continue the data communication. Because, the communication is not changed over during the designated period ($\Delta t$). In this, the designated period ($\Delta t$) is variable and can be set by the user arbitrary.

As shown in FIG. 5(c), the designated period ($\Delta t$) can be set in the following way. That is, a designated period from the open state to the closed state of the cabinet is set as ($\Delta t1$), and a designated period from the closed state to the open state of the cabinet is set as ($\Delta t2$).

Next, referring to the drawing, operation of the voice communication changing over section 116A in the controller 116 at the embodiment of the present invention is explained.

Figure 6:
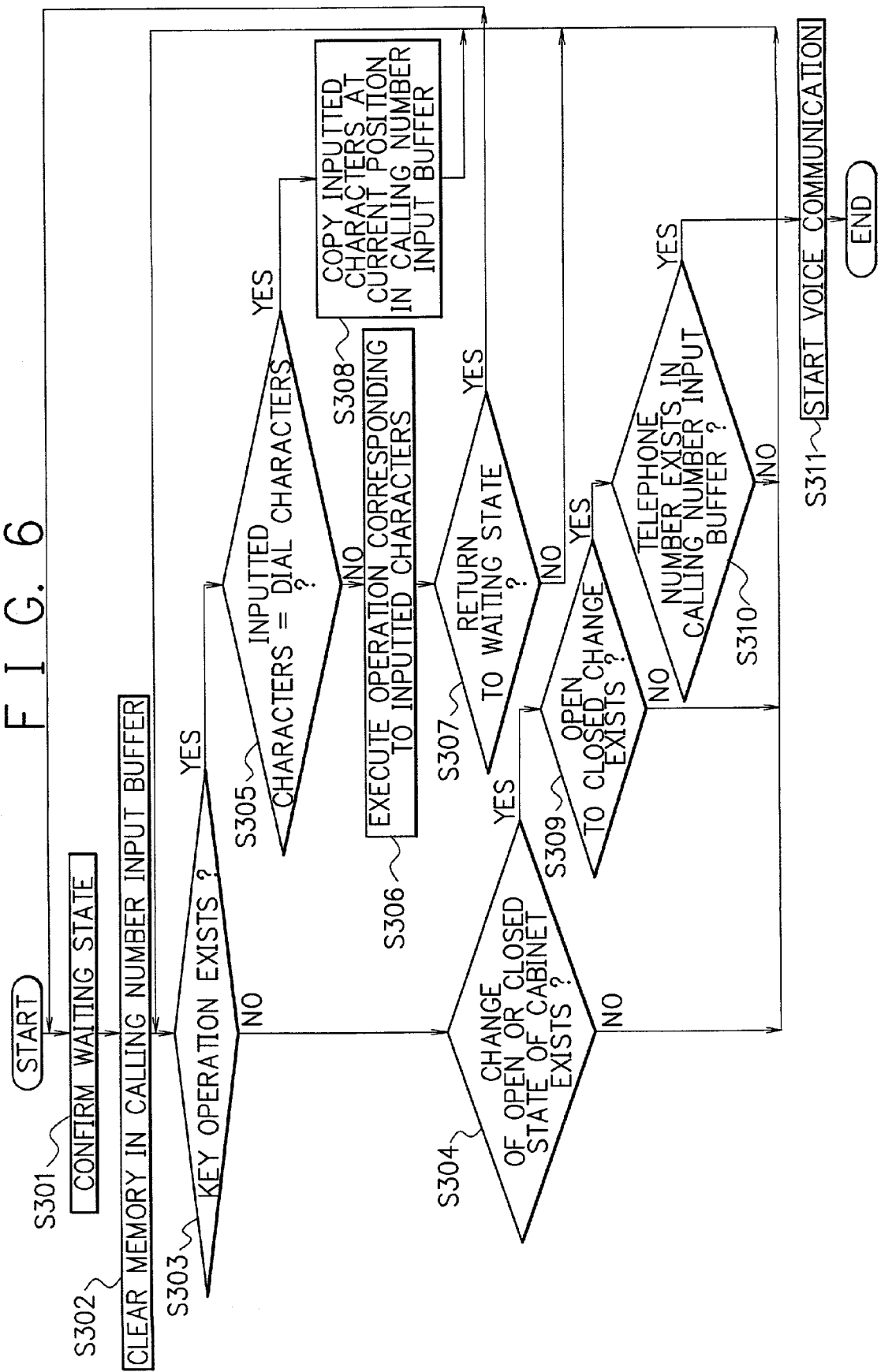
FIG. 6 is a flowchart showing operation of the voice communication changing over section in the controller at the time when data are inputted at the embodiment of a calling method of the present invention.

FIG. 6 is a flowchart showing the operation of the voice communication changing over section 116A in the controller 116 at the time when data are inputted at the embodiment of the calling method of the present invention.

First, the voice communication changing over section 116A confirms that the foldable mobile communication terminal is in the waiting state (step S301). In this, the waiting state is a state that the foldable mobile communication terminal is waiting for next operation after finishing previous operation. Next, the voice communication changing over section 116A clears the memory in the calling number input buffer 115 after confirming the waiting state (step S302). And the voice communication changing over section 116A judges whether key operation exists or not (step S303).

When the key operation does not exist (NO at the step S303), the open and closed state detector 114 detects whether the change of the open or closed state of the cabinet exists or not (step S304). When the change of the open or closed state of the cabinet does not exist (NO at the step S304), the operation returns to the step S303. When the key operation exists (YES at the step S303), it is judged whether inputted characters, focused by the display cursor, are dial characters using at keys for the dial composed of "numbers", "*", and "#" or not (step S305).

When the inputted characters or instructions are different from the dial characters (NO at the step S305), operation corresponding to the inputted characters or instructions is executed (step S306). And it is judged whether the operation returns to the waiting state or not (step S307), when the operation returns to the waiting state (YES at the step S307), the operation returns to the step S301. And when the operation does not return to the waiting state (NO at the step S307), the operation returns to the step S303.

When the inputted characters are the dial characters (YES at the step S305), the inputted characters are copied in the position where a pointer is currently positioned in the calling number input buffer 115 (step S308), and the operation returns to the step S303.

When the change of the open or closed state of the cabinet exists (YES at the step S304), it is judged whether this change is a change from "open" to "closed" or not (step S309). When the change is the change from "closed" to "open" (NO at the step S309), the operation returns to the step S303.

When the change is the change from "open" to "closed" (YES at the step S309), it is judged whether the data of a telephone number exists or not in the calling number input buffer 115 (step S310). When the data of the telephone number was not copied in the calling number input buffer 115 and the calling number input buffer 115 is empty (NO at the step S310), the calling cannot be executed, and the operation returns to the step S303.

When the data of the telephone number has been copied in the calling number input buffer 115 (YES at the step S310), the telephone number is a calling number, and the voice communication is started by calling the telephone number (step S311).

As mentioned above, after inputting a telephone number, when the state of the cabinet was changed to a shape (closed) with which the voice communication was able to be executed, calling to the telephone number is started. With this operation, the calling to the telephone number can be executed with minimum processes, and the voice communication can be started smoothly.

Figure 7:
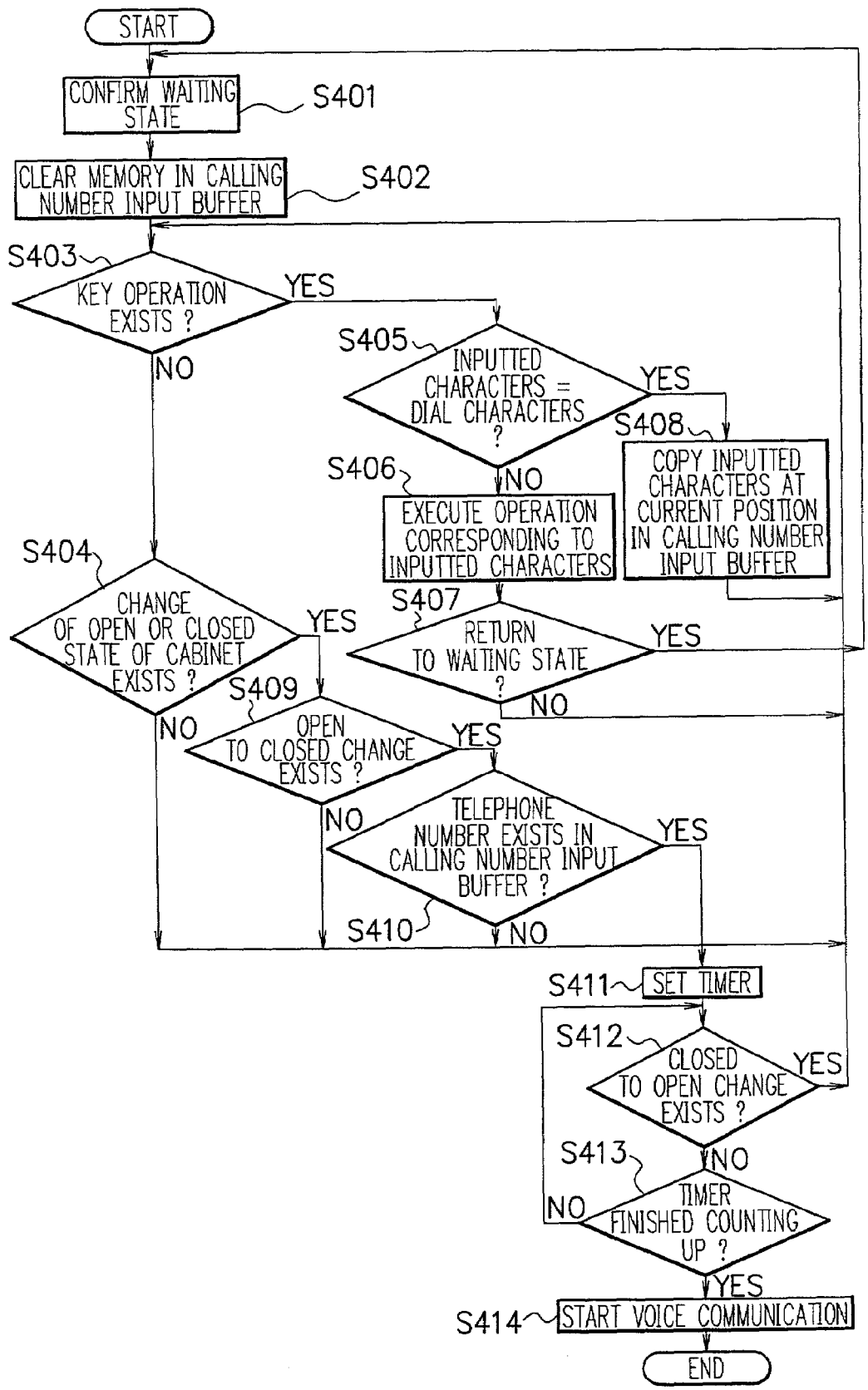
FIG. 7 is a flowchart showing operation of the voice communication changing over section in the controller at the time when data are inputted at a modified embodiment of the calling method of the present invention.

Referring to the drawing, a modified embodiment at the calling method of the present invention is explained. FIG. 7 is a flowchart showing the operation of the voice communication changing over section 116A in the controller 116 at the time when data are inputted at the modified embodiment at the calling method of the present invention. In this modified embodiment at the calling method of the present invention, operation at a case, in which a change from "closed" to "open" occurred within a designated period after changing from "open" to "closed", is explained.

As shown in FIG. 7, compared with the steps in FIG. 6, steps S401 to S410 are the same as the steps S301 to S310, and a step S414 is the same as the step S311 in FIG. 6, and steps S411 to S413 are newly added to the modified embodiment. Therefore, operation at the steps S411 to S413 is explained.

When data of a telephone number has been copied in the calling number input buffer 115 (YES at step S410), the voice communication changing over section 116A sets a timer having a predetermined time (step S411).

Next, it is judged whether a change from "closed" to "open" exists or not, while the timer is counting up (step S412). When it was judged that the change from "closed" to "open" existed (YES at the step S412), the operation returns to the step S403. That is, it was judged that the change from "open" to "closed" at the step S409 did not exist. When it was judged that the change from "closed" to "open" did not exist (NO at the step S412), it is judged whether the timer finished counting up (step S413).

When the timer finished counting up (YES at the step 413) and the cabinet is still at the closed state, the voice communication is started by calling to the telephone number (step S414).

As mentioned above, at the modified embodiment of the calling method of the present invention, after the cabinet was changed to a shape with which the calling was able to be executed, that is, after the cabinet became the closed state, the calling is started after the predetermined time passed. Therefore, the voice communication can be started smoothly under the actual using situation of the foldable mobile communication terminal. That is, actually, the user starts to call after closing the cabinet and moving the foldable mobile communication terminal to the ear of the user.

Next referring to the drawing, data receiving operation at the embodiment of the present invention is explained. FIG. 8 is a flowchart showing the operation of the voice communication changing over section 116A in the controller 116 at the time when data are receiving at the embodiment of the calling method of the present invention.

First, the voice communication changing over section 116A confirms that the foldable mobile communication terminal is in the waiting state (step S501). In this, the waiting state is a state that the foldable mobile communication terminal is waiting for next operation after finishing previous operation.

Next, the user starts to browse through data at the open state of the cabinet (step S502). And the voice communication changing over section 116A judges whether key operation exists or not (step S503). When the key operation does not exist (NO at the step S503), the open and closed state detector 114 detects the change of the open or closed state of the cabinet (step S504). When the change of the state of the cabinet does not exist (No at the step S504), the operation returns to the step S503.

When the key operation exists (YES at the step S503), in case that the inputted characters or instructions are different from the dial characters, operation corresponding to the inputted characters or instructions is executed (step S505). And it is judged whether the operation returns to the waiting state or not (step S506), in case that the operation returns to the waiting state (YES at the step S506), the operation returns to the step S501. And in case that the operation does not return to the waiting state (NO at the step S506), the operation returns to the step S503.

When the change of the open or closed state of the cabinet exists (YES at the step S504), it is judged whether this change is a change from "open" to "closed" or not (step S507). When this change is not the change from "open" to "closed" (NO at the step S507), the operation returns to the step S503.

When this change is the change from "open" to "closed" (YES at the step S507), data focused by the display cursor are confirmed, and it is judged whether the data are dial characters using at keys for the dial composed of "numbers", "*", and "#" or not (step S508).

When the data are not the dial characters (NO at the step S508), the operation returns to the step S503.

When the data are the dial characters, that is, the data are data of a telephone number (YES at the step S508), the data focused by the display cursor are copied in the calling number input buffer 115 (step S509). And the voice communication is started by calling the telephone number (step S510).

As mentioned above, corresponding to the states of the cabinet, the calling is executed by the data at the position of the cursor. With this operation, the calling to the telephone number can be executed with minimum processes. Further, when the shape of the cabinet is changed, the state of the communication is changed, therefore the user can easily change the state of the communication.

According to the present invention, as mentioned above, the inputted data are displayed at the open state of the cabinet, and the received data are also displayed at the open state of the cabinet. And data of a telephone number, displayed on the inner side displaying section, is stored, and the change of the state of the cabinet is detected. When the closed state of the cabinet, moved from the open state, is detected, the communication is changed over from the data communication to the voice communication to the destination of the stored telephone number. That is, by not setting the data of the telephone number after the cabinet was closed, the data of the telephone number for the voice communication can be set during the data communication such as inputting data and receiving data. Therefore, the data communication can be changed over to the voice communication with the minimum requirement operation. At the time when the state of the cabinet became a state in which the calling was possible, the calling has been already executed, therefore the operation can be made to be minimum, and the unnecessary no voice communication period until connecting to the destination can be avoided. As mentioned above, operation for the voice communication can be started at the open state of the cabinet, therefore the communication can be changed over smoothly from the data communication to the voice communication, by reducing one of the calling steps.

Further, according to the present invention, when the communication is changed over from the data communication to the voice communication during the data communication, the data communication is suspended. And when the voice communication was finished, the data communication can be resumed. Therefore, the suspension and resumption of the data communication can be executed smoothly, corresponding to changing over to the voice communication and cutting off the voice communication.

And in case that the cabinet was closed after the open state of the cabinet, and when the cabinet was opened again within a designated period, the data communication has not been changed over to the voice communication. Therefore, in a case that a user desired to change the inputting of data to the voice communication, but the user desired to continue the inputting data by changing his/her mind, the voice communication has not started yet for the designated period, consequently, the user can continue the data communication. And this designated period can be set to be variable, therefore the user can set this designated period arbitrarily.

As mentioned above, while the data communication is executing, when the cabinet was closed, the data communication is continued and is not changed over to the voice communication within the designated period. And also while the voice communication is executing, when the cabinet was opened, the voice communication is continued and is not changed over to the data communication within the designated period. Therefore, when the user changed his/her mind after closing or opening the cabinet, if the user desires to continue the current communication, the user can continue the current communication by opening or closing the cabinet within the designated period soon after the cabinet was closed or opened.

Further, according to the present invention, the designated period mentioned above has two designated periods, that is, a first designated period is the period from the open state of the cabinet to the closed state of the cabinet. And a second designated period is the period from the closed state of the cabinet to the open state of the cabinet. Both of the first and second designated periods can be set to be variable, and the user can easily set the two designated periods. That is, the first and second designated periods can be set to be different, therefore, the user can set these designated periods arbitrarily.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A foldable mobile communication terminal, in which data communication is executed at an open state of its cabinet and voice communication is executed at a closed state of said cabinet, comprising:
    an inner side displaying section for displaying at least one of data inputted and received at the open state of said cabinet;
    a calling number input buffer for storing data of a telephone number displayed on said inner side displaying section;
    a voice communication changing-over section for changing-over from said data communication to said voice communication that is established through said telephone number stored in said calling number input buffer, when a state, in which said cabinet is closed from the open state, is detected; and
    a controller, said voice communication changing-over section being contained in said controller,
    wherein when a user inputs telephone number data in said open state, said voice communication changing over section automatically writes the telephone number data into said calling number input buffer, and when the cabinet is in said closed state, the voice communication changing over section calls the telephone number automatically.

2. A foldable mobile communication terminal in accordance with claim 1, wherein said voice communication changing-over section suspends said data communication when said data communication is changed-over to said voice communication during said data communication, and resumes said suspended data communication when said voice communication is cut off.

3. A foldable mobile communication terminal in accordance with claim 1, wherein said voice communication changing-over section does not change-over from said data communication to said voice communication, when the open state of said cabinet is detected within a designated period after said cabinet is closed from the open state.

4. A foldable mobile communication terminal in accordance with claim 1, wherein said calling number input buffer stores the data of a telephone number, which is focused by a display cursor during inputting data and receiving data.

5. A foldable mobile communication terminal in accordance with claim 1, wherein said calling number input buffer stores data displayed during inputting data and receiving data as a telephone number, when said data is equal to a speed dial of said telephone number.

6. The foldable mobile communication terminal in accordance with claim 1, wherein the telephone number is set in said calling number input buffer while the user inputs the data.

* * * * *